United States Patent Office
3,252,925
Patented May 24, 1966

3,252,925
PREPARATION OF CELLULAR POLYURETHANE PLASTICS
Rudolf Merten, Cologne-Flittard, and Otto Bayer, Leverkusen, Germany, assignors to Farbenfabriken Bayer Aktiengesellschaft, Leverkusen, Germany, a German corporation
No Drawing. Filed May 28, 1962, Ser. No. 197,869
Claims priority, application Germany, May 31, 1961, F 34,061
4 Claims. (Cl. 260—2.5)

This invention relates to polyurethane plastics and to a method of preparing the same. More particularly it relates to cellular polyurethane plastics.

It has been heretofore known to utilize various active hydrogen containing compounds in reaction with polyisocyanates and a blowing agent to produce cellular polyurethane. Carbohydrates have been particularly of interest because of the large number of hydroxyl groups present and because of their availability at a low cost. It has been known to utilize these carbohydrates in reaction with aldehydes and or alkylene oxides to prepare active hydrogen compounds suitable in a polyaddition reactive with isocyanates to form rigid polyurethane foams.

Carbohydrates particularly mono and oligosaccharides have not been used in esterification procedures to prepare active hydrogen compounds for polyurethane plastics for the reason that these compounds are unusually sensitive to heat and chemical reagents particularly acids. Therefore, it could not be expected that suitable polyesters could be prepared.

It has been proposed in US Patent 2,993,015 to use dextran-modified polyesters together with polyisocyanates for the manufacture of resinous composition. These polyesters, however, are highly viscous and cannot be employed in the usual foaming equipment for making cellular polyurethanes.

It is, therefore, an object of this invention to provide an improved process for making cellular polyurethane plastics. It is a further object of this invention to provide an improved process for making rigid cellular polyurethane plastics. It is a further object of this invention to provide an improved method of making cellular polyurethane plastics based on carbohydrates as the active hydrogen compound.

The foregoing objects and others which will become apparent from the following description are accomplished in accordance with the invention, generally speaking, by providing cellular polyurethane plastics by reacting organic compounds containing active hydrogen atoms which are reactive with —NCO groups and organic polyisocyanates in a reactive mixture containing an inert gas wherein said organic compound containing active hydrogen atoms is an esterified carbohydrate. Thus the invention contemplates the use of polyesters prepared by reacting a carbohydrate with an organic polycarboxylic acid as the active hydrogen compound in the preparation of cellular polyurethane plastics. It has been found that in spite of the hydrophilic character of carbohydrates, excellent foam plastics result which are suitable for further treatment.

The polyesters used in accordance with this invention can be prepared by reacting any suitable carbohydrate with a suitable polycarboxylic acid by either a direct or a stepwise esterification of the components at temperatures of from about 130° C. to about 200° C. and preferably from about 140° C. to about 170° C. in a vacuum. Esterification catalysts and ester interchange catalysts such as sulfonic acid, alkalis, titanium alcoholates, and lead oxide may be added.

Any suitable carbohydrate with a molecular weight of up to 3000 may be used for the production of the polyols of this invention which are suitable for further reaction with organic polyisocyanates to prepare polyurethane plastics, provided that the carbohydrate contains at least 4 carbon atoms. The term "carbohydrate" as used herein refers to compounds composed of carbon, hydrogen and oxygen corresponding to the formula $C_x(H_2O)_y$ wherein $x$ and $y$ are whole integers and thus the compounds are monosaccharides when $x$ and $y$ are 4 to 7, disaccharides when $x$ is 12 and $y$ is 11, trisaccharides when $x$ is 18 and $y$ is 16 and polysaccharides when $x$ and $y$ are integers greater than 18. In other words, the bioses and trioses are excluded because they do not contain at least 4 carbon atoms, but any other suitable carbohydrate may be used including such monosaccharides as tetroses for example erythrose, erythrulose and the like; pentoses for example arabinose, xylose, ribose, arabinulose and the like; hexoses for example glucose, galactose, mannose, fructose, sorbose and the like; heptoses for example mannoheptoses and the like; disaccharides such as lactose, maltose, sucrose, melibiose, trehalose, cellubiose and the like; trisaccharides such as raffinose, melezitose and the like; tetrasaccharides such as lupeose, stachyose, cellotetraose and the like. Also included as suitable carbohydrates are acid degradated low molecular weight starches and all cellulose having an average molecular weight below 3000 as well as modified carbohydrates and their glycerides, cyclic acetals or acylates. The quantity of carbohydrates used should be at least 10% by weight calculated on the components added for esterification.

In addition to the carbohydrates other suitable hydroxyl compounds may be used in conjunction with the carbohydrates to prepare the esterification products such as, for example, polyalcohols including ethylene glycol, diethyleneglycol, triethyleneglycol, propyleneglycol, dipropyleneglycol, tripropyleneglycol, alkyleneglycol, butane-2,3-diol, butene-1,3-diol, hexane-2,5-diol, octadecanediol, octadecenediol, cyclohexane-1,4-dimethanol, glycerol, trimethylolethane, trimethylolpropane, pentaerythritol, mannitol, sorbitol, hydroxylalkylated polyphenols and, to a lesser extent, amino alcohols such as di- or triethanolamine and the like. These polyalcohols lower the viscosity of the carbohydrates and react with the polycarboxylic acids in the esterification procedure.

Any suitable polycarboxylic acid may be used in reaction with the carbohydrates and alcohols to prepare the polyesters used in the preparation of polyurethanes such as, for example, adipic acid, succinic acid, suberic acid, sebacic acid, oxalic acid, methyl adipic acid, glutaric acid, pimelic acid, azelaic acid, phthalic acid, terephthalic acid, isophthalic acid, 1,2,4-benzene tricarboxylic acid, thiodiglycollic acid, thiodipropionic acid, maleic acid, fumaric acid, citraconic acid, itaconic acid, trimellitic acid, dimerised and trimerised fatty acids, tartaric acid, and the like.

Owing to the high hydroxyl group content of the carbohydrates, monocarboxylic acids may be used in an amount of from about 1 to about 50 percent, preferably from about 5 to about 30 percent, based on the weight of the polycarboxylic acid. Any monocarboxylic acid may be used such as for example, acetic acid, propionic acid, oleic acid, stearic acid, palmitic acid, lauric acid, and particularly technical mixtures such as rape oil fatty acid, tall oil fatty acid, linseed oil fatty acid, train oil fatty acid, soya beans oil fatty acid, linseed oil acid, ricinoleic acid, and the like.

Where the polyesters contain unsaturation they may be further modified by the addition of halogen atoms to the molecular chain. Any halogen may be used, such as for example, chlorine, bromine, iodine, fluorine, and the like. This addition improves the fire resistance of finished polyurethane plastic products.

In the preparation of polyesters suitable for preparing polyurethanes in accordance with this invention it is preferred that the reactive components to be used in an amount such that the polyester will have an acid number below about 50 and for the best results below about 30, an hydroxyl content of at least 3% and a maximum of about 20%. Preferably, the hydroxyl content should be from about 7 to 15%. The use of carbohydrates generally leads to a smaller percent of hydroxyl groups than the theoretical value. The polyesters obtained are more or less viscous condensates depending upon the structure and light brown in color. These polyesters may be used in the process of this invention either alone or together with known polyhdroxyl compounds such as, for example, hydroxyl polyesters, polyhydric polyalkylene ethers, polyhydric polythioethers, polyacetals, and the like.

Any suitable hydroxyl polyester may be used such as, for example, the reaction product of a polycarboxylic acid and a polyhydric alcohol. Any suitable polycarboxylic acid may be used in the preparation of a polyester such as, for example, adipic acid, succinic acid, suberic acid, sebacic acid, oxalic acid, methyl adipic acid, glutaric acid, pimelic acid, azelaic acid, phthalic acid, terephthalic acid, isophthalic acid, 1,2,4-benzene tricarboxylic acid, thiodiglycollic acid, thiodipropionic acid, maleic acid, fumaric acid, citraconic acid, itaconic acid, and the like. Any suitable polyhydric alcohol may be used in the reaction with the polycarboxylic acid to form a polyester such as, for example, ethylene glycol, diethylene glycol, propylene glycol, butylene glycol, hexane diol, hexane triol, glycerine, bis-(hydroxy-methyl-cyclohexane), trimethylol propane, pentarerythritol, sorbitol, and the like.

Any suitable polyhydric polyalkylene ether may be used such as, for example, the condensation product of an alkylene oxide with a small amount of a compound containing active hydrogen containing groups such as, for example, water, ethylene glycol, propylene glycol, butylene glycol, amylene glycol, trimethylol propane, glycerine, pentaerythritol, hexanetriol and the like. Any suitable alkylene oxide condensate may also be used such as, for example, the condensates of ethylene oxide, propylene oxide, butylene oxide, amylene oxide and mixtures thereof. The polyalkylene ethers prepared from tetrahydrofuran may be used. The polyhydric polyalkylene ethers may be prepared by any known process such as, for example, the process decribed by Wurtz in 1859 and in the "Encyclopedia of Chemical Technology," volume 7, pages 257 to 262 published by Interscience Publishers in 1951 or in U.S. Patent 1,922,459.

Any suitable polyhydric polythioether may be used such as, for example, the reaction product of one of the aforementioned alkylene oxides used in the preparation of the polyhydric polyalkylene ether with a polyhydric thioether such as, for example, thiodiglycol, 3,3'-dihydroxy propylsulfide, 4,4'-dihydroxy butylsulfide, 1,4-(hydroxy ethyl) phenylene dithioether and the like.

Any suitable polyacetal may be used such as, for example, the reaction product of an aldehyde with a polyhydric alcohol. Any suitable aldehyde may be used such as, for example, formaldehyde, paraldehyde, butyraldehyde and the like. Any of the polyhydric alcohols mentioned above with relation to the preparation of the hydroxyl polyesters may be used.

The cellular polyurethanes are prepared by reacting the carbohydrate polyesters with an organic polyisocyanate and water and/or other blowing agents or additives.

Any suitable organic polyisocyanate may be utilized in the process of this invention such as, for example, aliphatic polyisocyanates, aromatic polyisocyanates, alicyclic polyisocyanates, and heterocyclic polyisocyanates including such as, for example, Ethylene diisocyanate,
Ethylidene diisocyanate,
Propylene diisocyanate,
Butylene diisocyanate,
Cyclopentylene-1,3-dissocyanate,
Cyclohexylene-1,4-dissocyanate,
Cyclohexylene-1,2-diisocyanate,
2,4-toluylene diisocyanate,
2,6-toluylene diisocyanate,
4,4'-diphenylmethane diisocyanate,
2,2-diphenylpropane-4,4'-diisocyanate,
p-Phenylene diisocyanate,
m-Phenylene diisocyanate,
Xylylene diisocyanate,
1,4-naphthylene diisocyanate,
1,5-naphthylene diisocyanate,
Diphenyl-4,4'-diisocyanate,
Azobenzene 4,4'-diisocyanate,
Diphenyl sulfone-4,4'-diisocyanate,
Dichlorohexamethylene diisocyanate,
Tetramethylene diisocyanate,
Pentamethylene diisocyanate,
Hexamethylene diisocyanate,
Furfurylidene diisocyanate,
1-chlorobenzene-2,4-diisocyanate,
Tri-isopropyl benzene diisocyanate,
p-Isocyanatophenyl-thiophosphoric acid triester,
p-Isocyanatophenylphosphoric acid triester,
1-(isocyanatophenyl)-ethyl isocyanate,
4,4',4''-triisocyanato triphenyl methane,
1,3,5-triisocyanato benzene,
2,4,6-triisocyanate toluene,
4,4'-dimethyl diphenyl methane-2,2',
5,5'-tetraisocyanate and the like; polyisocyanates of the above type which are substituted by various substituents such as OR, $NO_2$, Cl where R is lower alkyl such as methyl, ethyl, butyl, hexyl, the reaction products of the above isocyanates with less than equivalent quantities of polyhydroxyl compounds such as trimethylol propane, hexane triol, glycerine, butane diol; polyisocyanates which are masked with phenols or bisulphite; polymerized isocyanates with isocyanurate rings ureadiones and the like.

The organic polyisocyanate is generally used in an amount at least equivalent to the hydroxyl and carboxyl groups present. If water is used as the blowing agent, an additional quantity of isocyanate should be used. Further excess quantities of isocyanate may be incorporated into the foam structure by polymerization reactions or secondary addition reactions. Any other suitable blowing agent may be used either alone or in conjunction with water such as, for example, azo compounds, low boiling hydrocarbons, halogenated methanes, or ethanes and vinylidene chloride and the like.

Suitable halogenated methanes and ethanes include trichlorofluoromethane, dichlorodifluoromethane, dichlorofluoremethane, dichlorofluoroethane, difluorobromoethane, difluorodibromomethane, difluorodichloroethane and the like.

The foaming is preferably carried out in the presence of catalysts, for example, amines such as triethylamine, dimethylbenzylamine, 1 - dimethylamino - 3-ethoxy-propane, triethylene diamine, or metal salts such as tin-(II)-acylates, dialkyl-tin-(IV)-acylates, acetylacetonates of heavy metals, molybdenum glycolate. Any of the catalysts found in an article entitled "Catalysis of the Isocyanate Hydroxyl Reaction" by J. W. Britain et al., in Volume IV, Issue Number 11, page 207 of the "Journal of Applied Polymer Science" may be used. Other additional substances are emulsifiers, for example, oxethylated phenols of biphenylols, higher sulphonic acids, sulphuric acid esters of castor oil or ricinoleic acid, ammonium salts of oleic acid, form stabilizers such as alkylene oxide-siloxane copolymers, basic silicone oils or paraffins, dyestuffs, pigments, flameproofing agents and the like. The alkylene oxide-siloxane copolymers having the formula

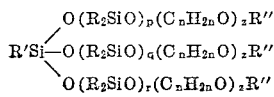

wherein R, R' and R'' are alkyl radicals having one to four carbon atoms; $p$, $q$ and $r$ are integers each having a value of from four to eight and $(C_nH_{2n}O)_z$ is a mixed polyoxyethylene oxypropylene group containing from 15 to 19 oxyethylene units and from 11 to 15 oxypropylene units with $z$ equal to from about 26 to about 34 are particularly advantageous. Organo-silicones of this type and a method of making them are disclosed in U.S. Patent 2,934,748.

Although all silicone compounds represented by the general formula given above are contemplated for use in the method of this invention, the preferred organo-silicone compounds having the formula:

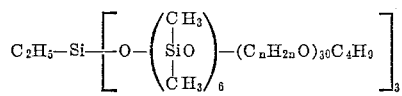

wherein $(C_nH_{2n}O)$ is a mixed polyoxyethylene and oxypropylene block copolymer containing about 17 oxyethylene units and 13 oxypropylene units.

The foam materials are produced in known manner by mechanical or manual mixing of the components and excellent foam materials are obtained which have high mechanical values, low brittleness, good adhesion, satisfactory pore structure and a low shrinkage tendency. In addition, the systems show a good mutual compatibility, also with respect to the halogenated methane and ethane derivatives frequently used as blowing agents. The cellular products prepared in accordance with this invention find particular use in sound and heat insulating applications such as curtain wall constructions and the like.

The invention is further illustrated by the following examples in which parts are by weight unless otherwise specified.

MANUFACTURE OF THE POLYESTER STARTING MATERIAL (A1)

(a) About 636 parts of diethylene glycol are heated to about 130° C. and in the course of about 2 hours a mixture of about 585 parts of adipic acid and about 343 parts of cane sugar are introduced. About 0.1 part titanium tetrabutylate is added and esterification is then carried out at about 160° C. and about 12 mm. Hg, whereby a dark brown polyester containing 8.7% OH and having an acid number of 28, a saponification number of 355 and a viscosity of 7000 cp./25° C. is obtained.

(b) A polyester is prepared according to method given under (a) by introducing the cane sugar in the course of about 30 minutes into the adipic acid which has been melted at about 150° C. and the diethylene glycol is then added. By this method a brown polyester is obtained which contains 7.6% OH, has an acid number of 25, a saponification number of 320 and a viscosity of 15,800 cp./25° C.

(c) A polyester is prepared according to (a), the components being brought together at about 25° C. and then esterified as described under (a). The product is a polyester containing 9.7% OH, acid number 26, saponification number 371 and viscosity 6930 cp./25° C.

(A2)

About 636 parts of diethylene glycol are heated to about 130° C. and a mixture of 585 parts of adipic acid and about 425 parts of cane sugar are added. About 0.1 part titanium tetrabutylate is added and the mixture is esterified at about 12 mm. Hg up to about 140° C. The polyester contains 11.1% OH, acid number 33, saponification number 330, viscosity 14,000 cp./25° C.

(A3)

About 636 parts of diethyleneglycol are heated with about 0.5 part of 30% $HPF_4$ to about 130° C. and a mixture of about 515 parts of cane sugar and about 585 parts of adipic acid are then added. After adding about 0.2 part of titanium tetrabutylate, esterification is first carried out to about 130°/12 mm. Hg. About 292 parts of a distilled rape oil fatty acid having an acid number of 191 are then added and esterified to about 160° C./12 mm. Hg. The product obtained is a brown polyester containing 7.1% OH, acid number 29, saponification number 334, viscosity 26,200 cp./25° C.

(A4)

848 parts of diethyleneglycol are heated with 1 part of 30% $HBF_4$ to about 130° C. and 343 parts of cane sugar and then 592 parts of phthalic acid are added. Esterification is carried out at 140°/12 mm. Hg. The product has an OH-content of 12.7%, an acid number of 100, a saponification number 184, and a viscosity of 17,200 cp./25° C.

(A5)

848 parts of diethyleneglycol are heated with 1 part of 30% $HBF_4$ to 130° C. and a mixture of 686 parts of cane sugar and 696 parts of sebacic acid are then added. After adding 0.2 part of titanium tetrabutylate, esterification is carried out at 140°/12 mm. Hg. A brown polyester is obtained having 15.4% OH, an acid number of 41, saponification number of 165 and a viscosity of 5500 cp./25° C.

(A6)

50 parts of bromine are added dropwise at 50° C. to 1000 parts of the polyester A3. The mixture is stirred for 4 hours at 50° C. and then shortly treated in vacuum. A brominated polyester is obtained containing 5.8 OH, having an acid number of 32 and a viscosity of 38,000 cp./25° C.

Example 1

About 100 parts of polyester A1(a) are thoroughly stirred together with about 2 parts of permethylated aminoethylpiperazine, about 0.3 part of a polysiloxane-polyalkyleneglycol ester having the formula

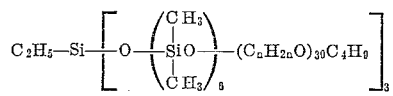

wherein $(C_nH_{2n}O)$ is a mixed polyoxyethylene and oxypropylene block copolymer containing about 17 oxyethylene units and 13 oxypropylene units; and about 6 parts of sodium castor oil sulphate containing 50% of water. After adding about 128 parts of 4,4-diphenylmethanediisocyanate (90%) the mixture is poured into molds. A fine pored hard foam plastic with the following physical properties is obtained:

| | |
|---|---|
| Weight per unit volume _____kg./m.³__ | 50 |
| Compression strength _____kg./cm.²__ | 2.1 |
| Impact strength _____kg./cm__ | 0.4 |
| Resistance to bending on heating _____° C__ | 118 |
| Uptake of water _____Percent__ | 0.6 |

Example 2

About 50 parts of polyester A1(b) are mixed with about 50 parts of a polyester prepared from adipic acid, phthalic acid anhydride, oleic acid and trimethylolpropane and having an hydroxyl of 380, about 2 parts of premethylated aminoethylpiparazine, about 0.2 part of dibutyl tin dilaurate and about 0.5 part of the polysiloxanepolyalkyleneglycol ester of Example 1. On adding about 80 parts of 4,4'-diphenylmethanediisocyanate (90%) and about 30 parts of trichlorofluoromethane, the mixture is foamed.

An unshrinkable hard foam plastic with the following properties is obtained:

Weight per unit volume _____ kg./m.³__ 37
Compression strength _____ kg./cm.²__ 1.3
Impact strength _____ kg./cm__ 0.2
Resistance to bending on heating _____ °C__ 108
Water uptake _____ percent__ 1.2

*Example 3*

About 70 parts of polyester A2 are thoroughly stirred together with about 30 parts of the polyester described in Example 2, about 2 parts of permethylated aminoethylpiperazine, about 0.2 part of dibutyl tin dilaurate, about 0.3 part of the polysiloxane polyalkyleneglycol ester of Example 1 and about 6 parts of sodium castor oil sulphate containing 50% water. About 158 parts of 4,4'-diphenylmethanediisocyanate are then added and the mixture is poured into molds in which a finely porous hard foam plastic of the following properties is obtained.

Weight per unit volume _____ kg./m.³__ 34
Compression strength _____ kg./cm.²__ 1.7
Impact strength _____ kg./cm__ 0.8
Resistance to bending on heating _____ °C__ 122
Water uptake _____ percent__ 0.5

*Example 4*

About 100 parts of polyester A3(a) are mixed with about 2 parts of permethylated aminoethyl piperazine, about 0.3 part of the polysiloxanepolyalkylene glycol ester of Example 1 and about 6 parts of sodium castor oil sulphate having about 50% water. About 109 parts of 4,4'-diphenylmethanediisocyanate (90%) are then added and the mixture is foamed. The resulting product is a non-brittle hard foam plastic having the following properties Weight per unit volume _____ kg./m.³__ 38
Compression strength _____ kg./cm.²__ 1.2
Impact strength _____ kg./cm__ 0.7
Resistance to bending on heating _____ °C__ 114
Uptake of water _____ percent__ 1.5

*Example 5*

100 parts of the polyester A4 are mixed with 2 parts of permethylated aminoethyl piperazine, 0.3 part of the polysiloxanealkylene glycol ester of Example 1 and 6 parts of sodium castor oil sulphate having about 50% water. 169 parts of 4,4'-diphenylmethanediisocyanate (90%) are then added and the mixture is foamed. The resulting product is a non-shrinking hard foam plastic having the following properties Weight per unit volume _____ kg./m.³__ 33
Compression strength _____ kg./cm.²__ 2.1
Impact strength _____ kg./cm__ 0.2
Resistance to bending on heating _____ °C__ 137
Water uptake _____ percent__ 1

*Example 6*

70 parts of the polyester A5 are mixed with 30 parts of propoxylated trimethylolpropane (OH number 380), 2 parts of permethylated aminoethylpiperazine, 0.1 part of dibutyl tin dilaurate and 0.5 part of the polysiloxane polyalkyleneglycol ester of Example 1. A mixture of 119 parts of 4,4'-diphenylmethanediisocyanate (90%) and 30 parts of trichlorofluoromethane are added. A finely porous rigid foam is obtained having the following properties:

Weight per unit volume _____ kg./m.³__ 33
Compression strength _____ kg./cm.²__ 1.3
Impact strength _____ kg./cm__ 0.3
Resistance to bending on heating _____ °C__ 93
Water uptake _____ percent__ 3.4

*Example 7*

100 parts of the polyester A6 are thoroughly mixed with 2 parts of permethylated diethylenetriamine, 0.2 part of dibutyl tin dilurate, 0.3 part of polysiloxane polyalkyleneglycol ester and 5 parts of sodium castor oil sulphate having about 50% water. 99 parts of 4,4'-diphenylmethanediisocyanate (90%) are then added and the mixture is poured into molds. The mixture expends in the mold to give a highly inflammable and highly incombustible rigid foam having the following properties:

Weight per unit volume _____ kg./m.³__ 43
Compression strength _____ kg./cm.²__ 3.7
Impact strength _____ kg./cm__ 0.3
Resistance to bending on heating _____ °C__ 115
Uptake of water _____ percent__ 2

It is, of course, to be understood that any suitable polyester utilizing as one of the starting components any of the carbohydrates set forth above may be used in the working examples in place of the polyesters utilized within. Further any of the other reactants set forth above may be used in reaction with the carbohydrates to prepare the polyesters such as the polyalcohols and polycarboxylic acids. In addition, any of the organic polyisocyanates may be used in place of those specifically used in the examples.

Although the invention has been described in considerable detail for the purpose of illustration, it is to be understood that variations may be made therein by those skilled in the art without departing from the spirit of the invention and the scope of the claims.

What is claimed is:

1. The process for preparing cellular polyurethane plastics which comprises reacting in a reaction mixture containing a blowing agent, an organic polyisocyanate and a halogenated hydroxyl polyester prepared by reacting a carbohydrate having the formula $C_x(H_2O)_y$ where $x$ and $y$ are integers of at least 4 and a polyhydric alcohol with a polycarboxylic acid and a monocarboxylic acid to form an unsaturated polyester in a first step, said carbohydrate being present in the preparation of said polyester in an amount of at least 10% by weight and halogenating the product of the first step.

2. The process of claim 1 wherein the carbohydrate is a monosaccharide.

3. The process of claim 1 wherein the carbohydrate is an oligosaccharide.

4. The process of claim 1 wherein said monocarboxylic acid has from about 5–20 carbon atoms.

References Cited by the Examiner

UNITED STATES PATENTS

| | | | |
|---|---|---|---|
| 2,363,581 | 11/1944 | Frosch | 260—9 |
| 2,829,070 | 4/1958 | Osborn | 260—75 |
| 2,990,378 | 6/1961 | Hurwitz et al. | 260—2.5 |
| 2,993,015 | 7/1961 | Novak | 260—9 |
| 3,055,867 | 9/1962 | Le Bras et al. | 260—2.5 |
| 3,079,350 | 2/1963 | Bernstein | 260—2.5 |

LEON J. BERCOVITZ, *Primary Examiner.*

DONALD E. CZAJA, *Assistant Examiner.*